US009119214B2

(12) United States Patent
Silva et al.

(10) Patent No.: US 9,119,214 B2
(45) Date of Patent: Aug. 25, 2015

(54) COORDINATED OPTIMIZATION OF UNDERLAY NETWORK COMMUNICATION FOR EFFICIENT USE OF SPECTRUM

(71) Applicant: BAE Systems Information and Electronic Systems Integration Inc., Nashua, NH (US)

(72) Inventors: Amber L. Silva, Merrimack, NH (US); Joshua D. Niedzwiecki, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 85 days.

(21) Appl. No.: 13/864,661

(22) Filed: Apr. 17, 2013

(65) Prior Publication Data

US 2013/0281108 A1 Oct. 24, 2013

Related U.S. Application Data

(60) Provisional application No. 61/625,843, filed on Apr. 18, 2012.

(51) Int. Cl.
*H04W 72/08* (2009.01)

(52) U.S. Cl.
CPC .............. *H04W 72/082* (2013.01); *Y02B 60/50* (2013.01)

(58) Field of Classification Search
CPC .................................................... H04W 72/08
USPC .............. 455/450–455, 464.1, 446, 447, 448, 455/464, 452.2; 370/329, 341, 431, 335, 370/312
See application file for complete search history.

(56) References Cited

U.S. PATENT DOCUMENTS

| | | | |
|---|---|---|---|
| 6,285,669 B1* | 9/2001 | Gutierrez | 370/335 |
| 2009/0325625 A1* | 12/2009 | Hugl et al. | 455/522 |
| 2010/0081449 A1* | 4/2010 | Chaudhri et al. | 455/452.2 |
| 2012/0044849 A1* | 2/2012 | Farmanbar et al. | 370/312 |

OTHER PUBLICATIONS

Zhao et al., "Proactive Detection of Spectrum Opportunities in Primary Systems with Power Control", IEEE Transactions on Wireless Communications, vol. 8, No. 9, Sep. 2009.

(Continued)

*Primary Examiner* — Lester Kincaid
*Assistant Examiner* — Gary Lafontant
(74) *Attorney, Agent, or Firm* — Daniel J. Long (57) ABSTRACT

A system and method for selecting an optimal frequency channel to communicate on in a wireless network is disclosed. The optimal frequency is selected from a predefined set of frequencies for all nodes to communicate on based on an exposure calculation. All underlay nodes collect initial SNR information from initial detection of other nodes and adjust their transmit power for an intended receiver such that the signal is received at the lowest allowable underlay-to-overlay power ratio, thus minimizing exposure. The desired underlay-to-overlay ratio is set based on how much we are capable of cancelling the overlay signal and the SINR at which a signal can be recovered such that the data can be successfully received from the underlay node. The optimal channel selected by this algorithm is the one with the least area of undesired exposure, or least probability of interfering with the primary user. The performance increases as a function of number of nodes, or data points.

7 Claims, 6 Drawing Sheets

(56) References Cited

OTHER PUBLICATIONS

Bansal et al., "Joint Overlay and Underlay Power Allocations Scheme for OFDM-based Cognitive Radio Systems", 978-1-4244-2519-8/10, 2010 IEEE.

Chakravarthy et al., "Cognitive Radio Centric Overlay/Underlay Waveform", 978-1-4244-2017-9/09, 2008 IEEE.

Learned et al., "Interference Multiple Access Wireless Network Demonstration Enabled by Real-Time Multiuser Detection", 1-4244-1463-6/08, 2008 IEEE.

Tranquilli et al., "Real Time Implementation of a Multiuser Detection Enabled Ad-Hoc Network", 978-1-4244-2677-5/08, 2008 IEEE.

Wang et al., "Power Allocation in OFDM-based Cognitive Radio Systems", 1930-529X/07, 2007 IEEE.

S.M. Kay, "Fundamentals of Statistical Signal Processing: Detection Theory", Prentice-Hall, 1998, p. 65.

Losey et al., "Free the Radio Spectrum", IEEE Spectrum, Jun. 2010.

Cherry, "The Myth and Reality of Spectrum Scarcity", IEEE Spectrum, Apr. 20, 2011.

Hahn et al., "Telecoms and the Battle for Bandwidth", CNN.com, Dec. 14, 2011.

Lazarus, "Radio's Regulatory Roadblocks", IEEE Spectrum, Sep. 2009.

Schneider, "LightSquared's GPS-Interference Controversy Comes to a Boil", IEEE Spectrum, Feb. 2012.

Rubenstein, "Radios Get Smart", IEEE Spectrum, Feb. 2007.

The Digital TV Transition: Reception Maps.

\* cited by examiner

COORDINATED OPTIMIZATION OF UNDERLAY NETWORK COMMUNICATION FOR EFFICIENT USE OF SPECTRUM

CROSS REFERENCE TO RELATED APPLICATIONS

This Application claims rights under 35 USC 119(e) from U.S. application Ser. No. 61/625,843 filed Apr. 18, 2012 the contents of which are incorporated herein by reference.

TECHNICAL FIELD

Embodiments are generally related to communications. Embodiments also relate to wireless networks. Embodiments additionally relate to a system and method for selecting the best frequency for underlay nodes to communicate on to achieve spectral efficiency without knowledge of location of underlay nodes or overlay transmitters and without the availability of white or gray space in spectrum.

BACKGROUND OF THE INVENTION

An emerging obstacle for today's communication systems is scarcity of available spectrum as is disclosed by J. Losey and S. Meinrath, (2010, June). Free the Radio Spectrum, IEEE Spectrum; S. Cherry. (2011, April). The Myth and Reality of Spectrum Scarcity. IEEE Spectrum; R. Hahn and P. Passell, (2011, December). Telecoms and the battle for bandwidth; R. Rubenstein. (2007, February). Radios Get Smart. IEEE Spectrum; and M. Lazarus. (2009), September). Radio's Regulatory Roadblocks, IEEE Spectrum; the contents of which are incorporated herein by reference. Generally, spectrum has been allocated to single users to prevent multiple users from interfering with one another. With the evolution of technology such as the Smartphone and the tablet, modern society increasingly relies on wireless data transmission to function. This has forced many in the wireless market to search for ways to secure more spectrum. AT&T recently attempted to acquire T-Mobile, reporting that its mobile broadband traffic increased 5000 percent over three years. Controversy continues of LightSquared's plans to provide cellular service on spectrum currently reserved for satellite communications as is disclosed by Schneider. (2012, February). LightSquareds GPS-Interference Controversy Comes to a Boil. IEEE Spectrum, the contents of which are incorporated herein by reference. Solutions have been proposed such as license auctions, unlicensed allocation, like Wi-Fi, where devices share spectrum, and operating in white space, spectrum originally left unoccupied by TV channels. The new 802.22 standard attempts to allow multiple users on the same channel by determining which channel can be used without causing interference. A need to find new ways to use spectrum efficiently in wireless communication is increasing.

Various solutions have been proposed to maximize use of spectrum by allowing unlicensed users to share the same spectrum as licensed users. In P. Wang, M. Zhao, L. Xiao, S. Zhous and J. Wang, "Power Allocation Proceedings", 2007, pp. 4061-4065, the contents of which are incorporated herein by reference, an interactive partitioned water filling algorithm is proposed to fill spaces in spectrum when the primary user is not detected. In G. Zhao, G. Y. Li, and C. Yang, "Proactive Detection of Spectrum Wireless Commun., vol. 8, (9), pp. 4815-4823, September 2009, the contents of which are incorporated herein by reference, a closed-loop power control method is proposed that allows transmission even when the primary user is detected as long as the primary user is outside the interference range of the transmission. In G. Barisal, O. Duval, and F. Gagnon, "Joint Overlay and Underlay Power Allocation Scheme for OFDM-based Cognitive Radio Systems," in IEEE, 2010, joint overlay and underlay power allocation is proposed.

Given the evolving importance of finding new ways to maximize usable communications capacity, it is worthwhile to explore other methods to share pre-allocated spectrum. The solutions designed to borrow unoccupied space will not be feasible when the primary user is always transmitting. Other solutions require knowledge of position of underlay and overlay transmitters or control over both the transmitters. These solutions do not consider the possibility for multiple underlay transmissions at uncontrolled locations. The concept of the overlay/underlay approach V. Charavarthy, A. Wu, M. Temple, F. Garber and X. Li, "Cognitive Radio Centric Overlay/Underlay Waveform," in IEEE. 2008 is that the overlay, or overlay signal, occupies unused, white space in spectrum while the underlay occupies underused, gray space in spectrum.

A need therefore exists for a way to select the best frequency for underlay nodes to communicate on to achieve spectral efficiency without knowledge of location of underlay nodes or overlay transmitters and without the availability of white or gray space in spectrum.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for communications.

It is another aspect of the disclosed embodiments to provide for wireless networks.

It is a further aspect of the disclosed embodiments to provide for a system and method for selecting the best frequency for underlay nodes to communicate on to achieve spectral efficiency without knowledge of location of underlay nodes or overlay transmitters and without the availability of white or gray space in spectrum.

The aforementioned aspects and other objectives and advantages can now be achieved as described herein. The underlay communication is jointly optimized by combining power and frequency information collected from all underlay radios at each of their locations. This allows for underlay communication, with a continuously transmitting primary user. The optimization method does not require knowledge of geographical location of the primary user or underlay nodes nor does it require underlay-overlay coordination.

A frequency is selected from a predefined set of frequencies for all nodes to communicate based on an exposure calculation. All underlay nodes collect initial SNR information from initial detection of other nodes transmitting on the available frequencies. Once this information is gathered, the ideal transmit power is calculated for each underlay node when transmitting to intended receiver. This is defined as the minimum transmit power such that the signal is received at the intended receiver at the lowest allowable underlay-to-overlay power ratio, thus minimizing exposure. The desired underlay-to-overlay ratio is set based on the amount of interference suppression achievable by cancelling the overlay signal and the required SNR such that data can be successfully received from the underlay node. The best channel to communicate on is defined as the one with the least area of undesired exposure, or least probability of interfering with the primary user. The performance of selecting a channel that minimizes exposure increases as a function of number of nodes, or data points.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

I. Framework

The use of the algorithm is relevant for any underlay communications application where the goal is to form a network on a preoccupied frequency without interfering with the primary spectrum user. Prior to forming a network using a selected frequency, underlay nodes will need to initialize by assessing their environment and finding other underlay nodes with respect to network formation. The next section describes a general operational scenario to consider and introduces a mathematical model to begin to characterize underlay communications performance.

A. System Operational Framework

A general scenario includes M overlay signals transmitting on different frequencies and N underlay radios. The overlay signal transmitters and underlay nodes are placed randomly in space similar to a typical environment as disclosed in DTV Reception Maps, the contents of which are incorporated herein by reference. For this scenario, all overlay and underlay nodes remain stationary. Initially, each underlay radio does not have any knowledge of the presence of other underlay radios or their relative location to the overlay signals.

The underlay codes will assess their own environment by scanning over the predefined set of frequencies. Underlay nodes will measure power observed from the overlay signal and store SNR estimates on each of those frequencies. Underlay nodes will then individually select a frequency that provides the best coverage for their non-interfering transmissions. The frequency with the highest received overlay signal power with respect to an individual node will be selected as the best frequency for that node because it will allow for underlay communication while minimizing interference with the overlay signal.

Underlay nodes will then need to transmit a signal such that other underlay nodes may identify their presence. Nodes will transmit a beacon at a low data rate on their selected frequency. The beacon is a predefined pseudorandom noise (PN) sequence with a unique node ID appended to the end. The goal is that the beacon signal will be designed for minimal interference with the overlay signal occupying that frequency. The sequence will be known by other underlay nodes, but will appear like additive white Gaussian noise to detectors without knowledge of the original PN sequence.

When nodes are finished transmitting their beacon signal, they will wait for a response from other underlay nodes and scan all other frequencies to detect the presence of other underlay beacon transmissions. Node receivers will use a matched filter detector matched to the known PN sequence. If a beacon signal is detected and the node ID is different than previously detected underlays, nodes will exchange messages referred to as a beacon response. These messages will begin with a different predefined PN sequence to serve as an alert and will be followed by data including channel information and information about previously detected nodes.

Once channel information has been exchanged between nodes, the frequency that is best for all underlay radios to form a network on is selected using the algorithm of the present invention algorithm. This algorithm combines statistics collected by underlay nodes on all channels and determines the best frequency for non-interfering underlay communication.

Figure 1:
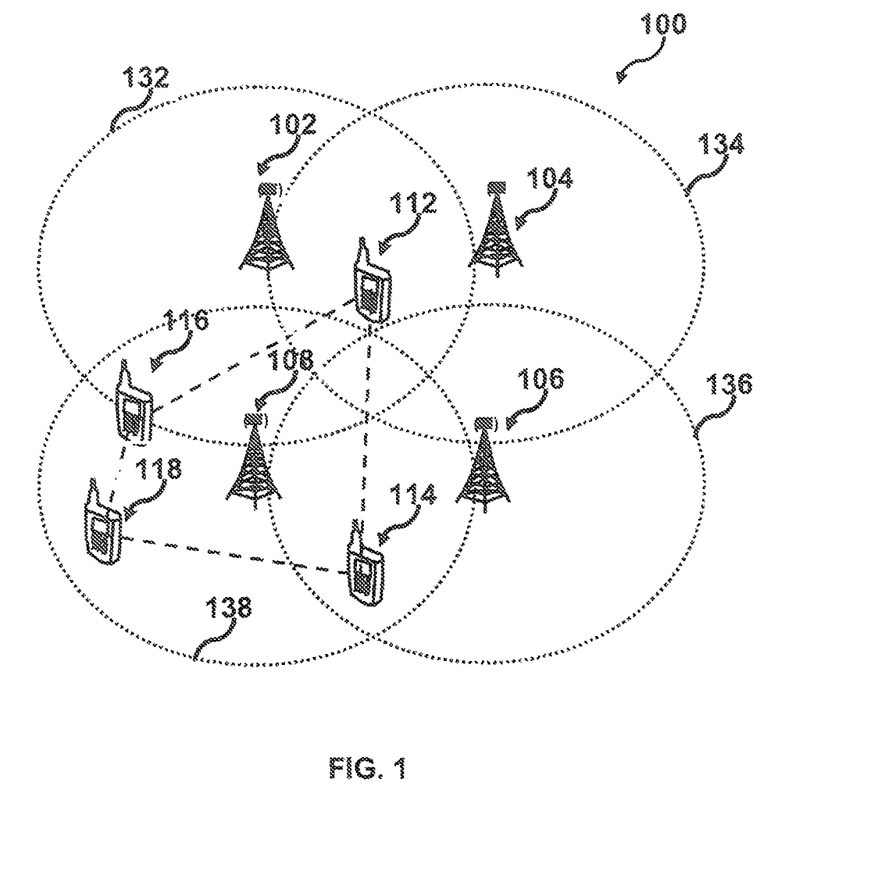
FIG. 1 illustrates is a schematic diagram of a system showing the operational scenario for selecting a frequency channel to communicate on in a wireless network, in accordance with the disclosed embodiments.

FIG. 1 is a schematic drawing of a system 100 showing the operational scenario for selecting a preoccupied frequency channel to communicate on in a wireless network. The system 100 has overlay transmitters 102, 104, 106 and 108 on different frequencies, randomly distributed underlay nodes 112, 114, 116 and 118 and channels with some area of coverage 132, 134, 136 and 138. Underlay nodes 112, 114, 116 and 118 initially scan predefined frequencies for the best coverage, or least amount of exposure, detect one another, and exchange information at a low data rate. Information from all underlay nodes 112, 114, 116 and 118 is used with the algorithm to select a frequency to communicate on. Underlay nodes 112, 114, 116 and 118 then form a network on the selected frequency.

B. Signal Model

The signals that need to be modeled in order to analyze the described operational framework are the overlay signals and the underlay radios. Then the performance of the underlay radios in the presence of an overlay signal is further explored.

A good candidate for an overlay signal would be a common commercial signal such as Digital Television (DTV). For simplification, the overlay signals are mathematically modeled after a DPI signal as band limited additive white Gaussian Noise (AWGN) with an 8 MHz bandwidth. The transmitted overlay signal is referred to as D(t).

The underlay signal must be designed to achieve a low underlay-to-overlay power ratio. Thus, a beacon will be designed such that, given knowledge of the PN sequence high processing gain can be achieved at the receiver's matched filter detector. The desired beacon signal has a chip rate that is close to, but slightly less than, the bandwidth of the overlay signal and will be transmitted at a power much lower than the transmit power of the overlay signal. The BPSK modulated PN sequence is a 1×J vector defined as a=[$a_1$ $a_2$ ... $a_J$]. The sequence is filtered with a root raised cosine equation as P[n] where 0≤n≤K−1. The transmitted beacon is modeled as:

$$b[n] = \sum_{j=1}^{J-1} a_i P(n - iT_s)$$ Equation (1)

where $T_s$ is the symbol interval and 0≤n≤L−1 with L=J+K−1 samples.

The received signal, x=[$x_1$ $x_2$ ... $x_L$], at any location is then a function of the transmitted underlay and overlay signals and the noise introduced:

$$X = \alpha_b b + \alpha_D D + n,$$ Equation (2)

where n is assumed to be AWGN and α represents free space path loss of a transmission.

II. Theoretical Analysis

Given a set of functions for the transmitted and received signals in the operational environment, expected performance of the underlay nodes can be assessed. Some design trades can be made to improve the detection performance of the matched filter while controlling total time for nodes to initialize and detect one another as well as the interference caused by the underlay radio transmissions.

A. Beacon Design

The objective of the beacon transmission is to enable the underlay receivers to detect the signal without disrupting the desired quality of the overlay signal. Thus underlay radios will transmit a signal at a lower power and low data rate. As the number of bits in the PN sequence is increased, the transmit power is decreased and acceptable underlay performance is maintained. The cost of increasing the length of the PN sequence will be an increase in total time for one transmission, which will affect the total time for the underlay network to converge.

For example, a PN sequence of length 2048 bits with chip rate 6 MHz can be modeled. In this case the nodes will have a processing gain of:

$$L_c = T_b/T_c = 2048 = 33 \text{ db}$$ Equation (3)

The beacon signal will then have a transmission time of 2048/6×10$^6$=0.34 ms.

B. Beacon Detection

Underlay radios use a matched filter detector at the receiver to detect the known PN sequence transmitted by other underlays. The constraint on the detector is a fixed false alarm rate, $P_{FA}$. A Neyrnan-Pearson (NP) likelihood ratio as disclosed in S. M. Kay, *Fundamentals of Statistical Signal Processing: Detection Theory*, Prentice Hall, 1998 p. 65 the contents of which are incorporated herein by reference to calculate the detector threshold, γ that will meet this constraint is used. The likelihood ratio compares the probability distribution of a received signal with the beacon signal present to the probability distribution of a received signal without the beacon signal present.

Without knowledge of the location of the transmitting node, the path loss of the beacon signal must be estimated. This is calculated using a maximum likelihood estimate and can be simplified to $$\hat{\alpha}_b = \frac{x^H b}{b^H b}.$$ Equation (4)

After some computation, the NP likelihood ratio can be converted to a general inequality comprised of the received signal, x, the original beacon signal, b, scaled by the free space path loss estimate calculated in (4), and the covariance matrix C, where C=σ$^2$I+E[DD$^H$] and I is the identity matrix:

$$x^H C^{-1} \hat{\alpha}_b b > \ln(\gamma) + \frac{1}{2} \hat{\alpha}_b b^H C^{-1} \hat{\alpha}_b b.$$ Equation (5)

The probability of detection by a node with the known PN sequence is function of the underlay energy at the receiver:

$$P_D = Q(Q^{-1}(P_{FA}) - \sqrt{\alpha_b^2 b^H C^{-1} b}).$$ Equation (6)

It is the total energy of the beacon signal that will dictate the underlay-to-overlay ratio at which the signal can successfully be detected by other underlay receivers. Thus, the underlay transmit power and the signal chip rate will dictate how well an underlay node will be able to detect the presence of another underlay signal.

Once underlay nodes have detected one another and shared information, this information is used to select the best frequency for all nodes to move to. The method of selecting this frequency is the novel algorithm.

III. Algorithm

The motive for the algorithm is to select the best frequency for N underlay nodes in the network to transmit on without interfering with the primary user. The best frequency is defined as the one on which underlay nodes are the least exposed as defined.

Exposure can be defined as the ratio of the observed power from a transmitting underlay node, i, to the observed power of a transmitting overlay signal on frequency f at any location (x,y)∈ X, namely;

$$\in_{i,f}(x, y, P) = \frac{U_{i,f}(x, y, P)}{W_f(x, y)},$$ Equation (7)

where $U_{i,f}$(x,y,P) is the power received at location (x,y) by the underlay node, i, transmitting on frequency f, at power P and $W_f$(x,y) is the power received at location (x,y) by the overlay transmitter on frequency f.

Underlay nodes will adjust their transmit power for an intended receiver such that the signal is received at the lowest allowable underlay-to-overlay power ratio, thus minimizing exposure. Each underlay node will have SNR information from all other underlay nodes after initial beacon detection. Underlay nodes will use this information to adjust their transmit power to a minimum allowable transmit power when transmitting to a specific intended receiver. The transmit power of the underlay node is bounded by the minimum exposure and signal-to-noise ratios at which the intended receiver will be able to successfully receive the data. Given a minimum exposure, $\Gamma$, and a minimum SNR, $\zeta$, the underlay transmit power from node i to intended receiver j is bounded by:

$$P_{i,j} = \underset{P}{\mathrm{argmin}}\left\{P : \frac{U_{i,f}(x_j, y_j, P)}{W_f(x_j, y_j)} \geq \Gamma, \frac{U_{i,f}(x_j, y_j, P)}{\sigma^2} \geq \zeta\right\} \quad \text{Equation (8)}$$

Previously research has proven that interference can be suppressed by 30 to 40 dB as is disclosed in J. Tranquilli et al., "Real Time Implementation of a Multiuser Detection Enabled Ad-Hoc Network," in *IEEE MILCOM* proceedings, 2008 and R. Learned et al., "Interference Multiple Access Wireless Network Demonstration Enabled by Real-Time Multiuser Detection," in *Radio Wireless Symposium*, 2008, the contents of which are incorporated herein by reference. An obtainable suppression value in this range is assumed and, thus, in, these simulations, a practical target value for $\Gamma$ would be −30 to −40 dB.

Figure 2A:
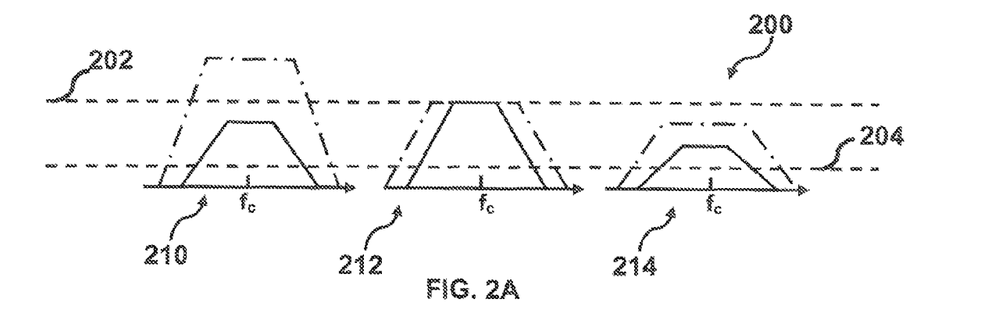
FIG. 2A-C illustrates a graphical representation for selecting a frequency channel to communicate on in a wireless network, in accordance with the disclosed embodiments.
Figure 2B:
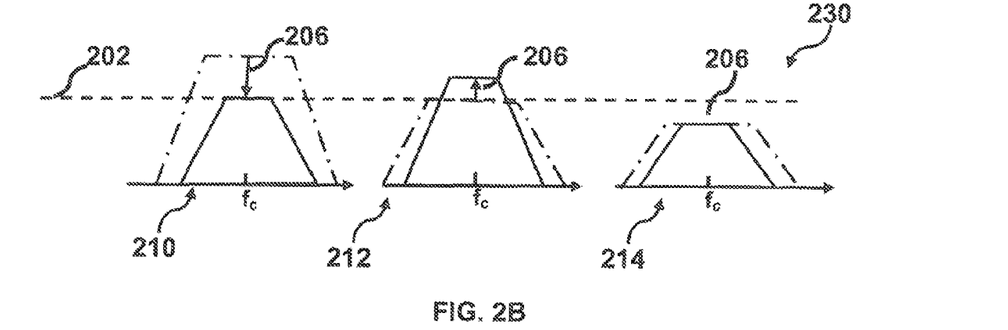
Figure 2C:
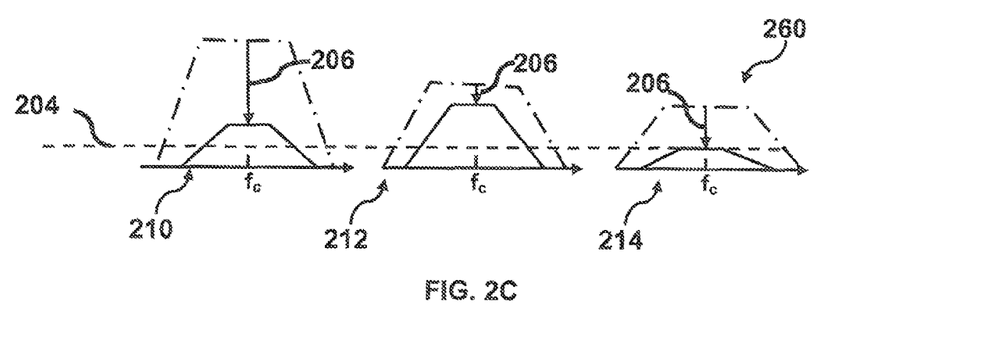

FIG. 2A-C shows illustrative representations 200, 230 and 260 for calculating the best transmit powers for each underlay node to use when transmitting to another intended underlay node and the calculation of exposure using this data. In FIG. 2A, received powers at three different underlay nodes 210, 212, and 214 is represented. In this scenario an overlay signal is transmitting and underlay node 212 is transmitting. All nodes observe the overlay signal at different power levels (dB), represented with a dotted polygon, and nodes observe the underlay signal at different power levels (dB), represented with a solid polygon, based on their relative locations. Due to the overlay power received at each node, the desired receive powers from underlay node 212 to underlay node 210, $\tau_{(2,1)}$, and from underlay node 212 to underlay node 214, $\tau_{(2,3)}$, are represented as reference numerals 202 and 204. In FIG. 2B, the transmit power that node 212 would need to adjust to if it were to transmit to node 210 is calculated. The power would need to be adjusted such that it is received at a power level denoted as $\tau_{(2,1)}$ and represented by numeral 202. The exposure, or underlay-to-overlay ratio, that would result at each node location given this transmit power is represented as reference numeral 206. In FIG. 2C, the transmit power that node 212 would need to adjust to if it were to transmit to node 214 is calculated. The power would need to be adjusted such that it is received at a power level denoted as $\tau_{(2,3)}$ and represented by numeral 204. The exposure, or underlay-to-overlay ratio, that would result at each node location given this transmit power is represented as reference numeral 206. The resulting exposure, underlay-to-overlay ratio, at each underlay node location from node 212's transmissions in 230 and 260 is calculated and summed. This can be repeated for each node in the network on each frequency to get a total exposure calculation for each available frequency. The frequency with the least total exposure will be selected as the frequency for the underlay nodes to operate on.

The total exposure on a given frequency is the combination of exposure from all transmitting nodes to all possible receiving nodes integrated over all points in the set X. For the purpose of the exposure calculation, this implies that only one node is transmitting to any other node at a given time and all nodes have equal probability of transmitting or receiving. To minimize the total exposure of our underlay network over all points (x,y), all predefined frequencies f∈ F are optimized over, which yields:

$$\hat{f} = \underset{f \in F}{\mathrm{argmin}}\left\{\sum_{i=1}^{N}\sum_{j=1, j\neq i}^{N}\int_{x,y \in X}\varepsilon_{i,f}(x, y, P_{i,j}(f)), dxdy\right\}, \quad \text{Equation (9)}$$

where the result of this equation is the frequency that underlay nodes would select to form a network on using this method.

In this scenario, there is no knowledge of infinite points in the set X, but only knowledge of a finite number of data points at the locations of each of the underlay nodes. Thus, the optimization problem decides the frequency and transmit powers that minimize the sum of exposures at all underlay nodes [1, 2, . . . , N] for every combination of transmitting node, i, and intended receiver, j which is defined as $$\hat{f} = \underset{f \in F}{\mathrm{argmin}}\left\{\sum_{i=1}^{N}\sum_{j=1, j\neq i}^{N}\sum_{k=1}^{N}\varepsilon_{i,f}(x_k, y_k, P_{i,j}(f))\right\}. \quad \text{Equation (10)}$$

An example of one instance of the exposure calculations is illustrated in FIG. 2.

IV. Simulation Results

Simulations carried out compares the algorithm of the present invention algorithm with two additional techniques; the optimal frequency selection given knowledge of all points in X and randomized frequency selection.

A. Simulation Setup

For all test cases, M overlay signals and N underlay nodes were distributed in the same 10 km×10 km space with a uniform random distribution. As is disclosed in *DTV Reception Maps*, to emulate a common digital TV signal, each of the overlay signals were transmitting at a power on the order of kilowatts on different frequencies in the UHF band, starting at 1 GHz and spaced 9 MHz apart. The noise floor was set to −90 dB such that SNR was practically negligible. Free-space-path-loss was assumed.

To simulate the algorithm used, it was assumed that all underlay nodes had exchanged information and, thus, had estimates for received power from each node on each frequency. Using this information, nodes calculated the transmit power that they would adjust to for each intended receiver on each frequency with Equation (8). In this case the exposure threshold at the underlay receiver was set to −30 dB. New underlay-to-overlay ratio, or exposure, values were calculated at all data points for each transmitter and intended receiver combination based on these power adjustments. Using these exposure values and Equation (10), the total exposure as observed by the N underlay nodes was calculated. The frequency selected by the algorithm was determined as frequency with the minimum calculated total exposure.

To determine the optimal frequency, the simulation calculated true total exposure from Equation (9) on each channel given knowledge of all points and all overlay signal and underlay radio transmit powers. The underlay-to-overlay values at all points could be calculated using the free-space-path-loss equation.

The performance of three algorithms was compared by determining the true exposure on each of the frequencies selected. Data, such as the average area of undesired exposure, was determined by calculating the total exposure greater than a chosen exposure threshold and averaging over the total number of possible transmissions, which is equal to N(N−1).

Figure 3A:
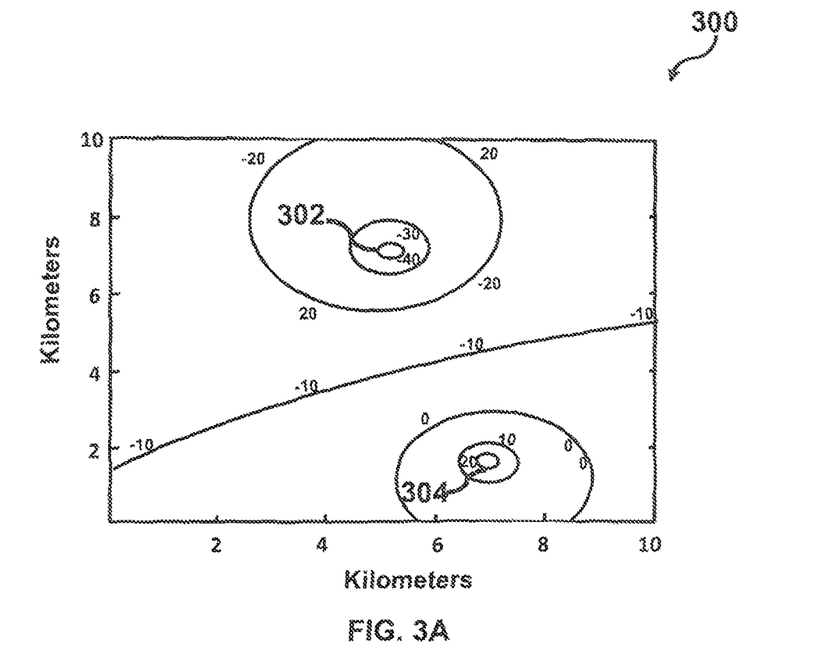
FIG. 3A illustrates a graph showing an example of exposure of a transmitting underlay node on a randomly selected overlay frequency, in accordance with the disclosed embodiments.
Figure 3B:
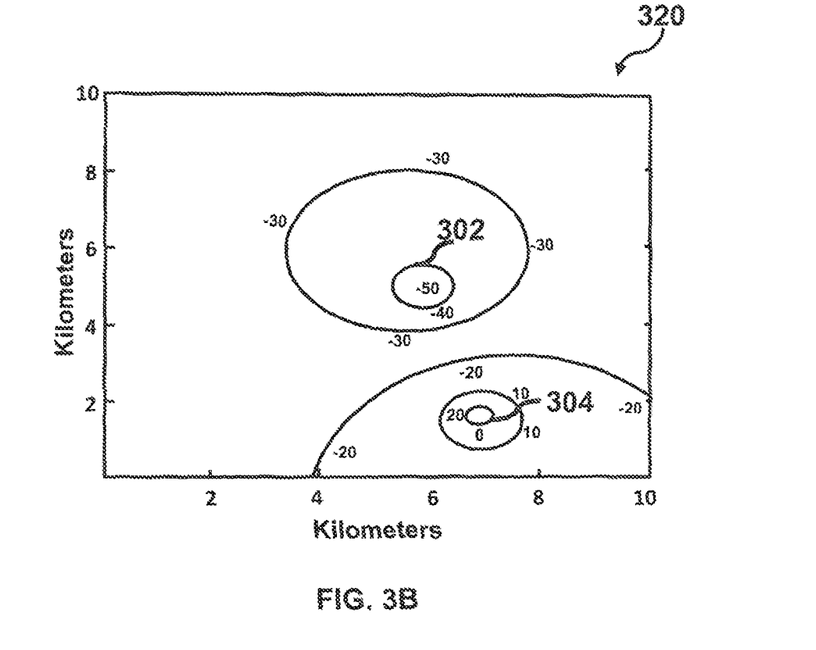
FIG. 3B illustrates a graph showing an example of exposure of the same transmitting underlay node on an overlay frequency selected based on the minimum calculated total exposure, in accordance with the disclosed embodiments.

FIG. 3A illustrates a graph 300 showing an example of exposure of a transmitting underlay node on a randomly selected overlay frequency and FIG. 3B illustrates a graph 320 showing an example of exposure of the same transmitting underlay node to the same intended receiver on an overlay frequency selected with the invention algorithm. Given one underlay node is transmitting on the selected frequency, the improvement in area of exposure above a specified underlay-to-overlay ratio from the randomly selected frequency to a frequency selected with the algorithm of the present invention algorithm is shown. The overlay and underlay locations are represented by reference numeral 302 and 304 respectively.

B. Results

Figure 4:
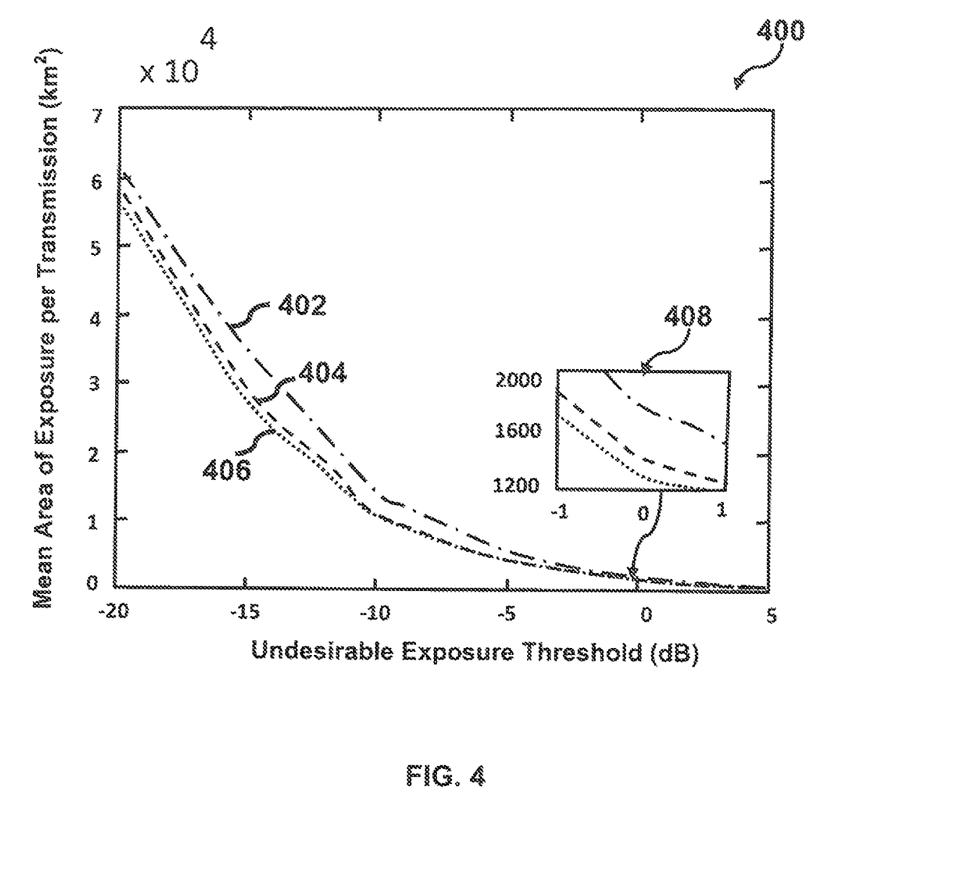
FIG. 4 illustrates a graph showing the expected area of undesirable exposure per transmission versus a predefined exposure threshold, in accordance with the disclosed embodiments.

The results presented in this section relate various operational scenarios to the overall effectiveness of the algorithm. From each possible frequency occupied by an overlay signal, the expected area of undesired exposure of an underlay transmission, defined as the mean total area with exposure above a desired threshold, can be characterized. FIG. 4 shows a graph 400, where the expected area of undesired exposure decreases as the threshold is increased. The results were generated with five overlay signals transmitting at 5 kW and 20 underlay nodes. As the underlay-to-overlay ratio threshold increases, the expected area of exposure of the underlay transmission decreases as shown in the FIG. 4. Threshold values should correspond to an acceptable SINR, or Protection Ratio (PR), such that primary users may still operate within a specified quality of reception. Reference numerals 402, 404 and 406 represent randomized, the invention algorithm, and optimal channel, selection performances and the enlarged view 408 of the particular data point in the graph 400 is shown in FIG. 4.

Figure 5:
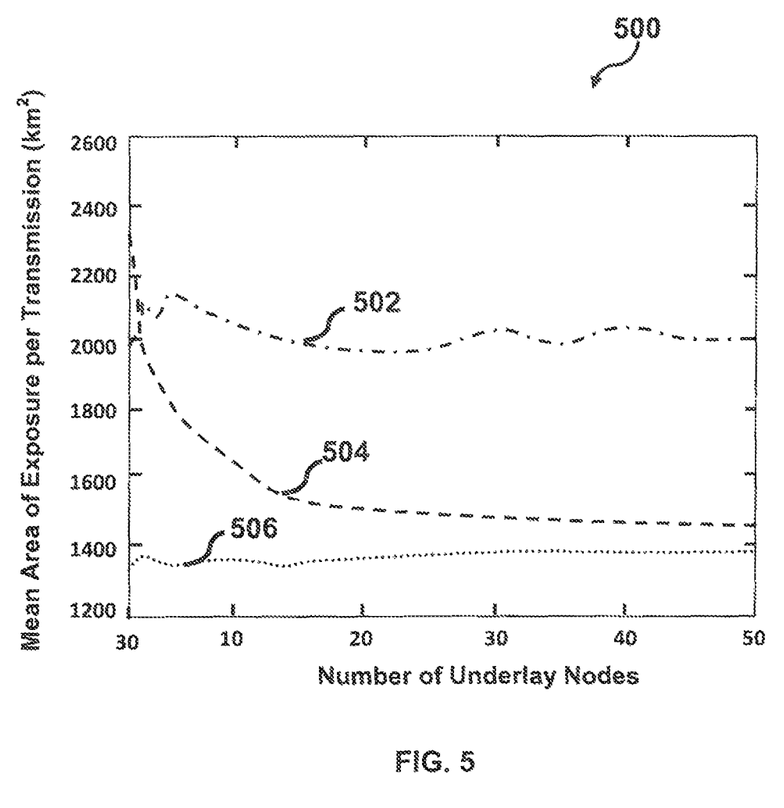
FIG. 5 illustrates a graph showing the performance of the invention algorithm frequency selection method compared to optimal performance and randomized frequency selection versus the number of underlay nodes, or data points, in accordance with the disclosed embodiments.

Intuitively, given the equation formulated for exposure, the ability of the underlay nodes to determine the best overlay channel should approach optimal performance as the number of nodes, or data points, increase. FIG. 5 demonstrates the performance of the algorithm as compared to optimal and randomized frequency selection as graph 500. This proves that as the number of data points as provided by the underlay nodes increases, the performance of the algorithm of the present invention algorithm approaches optimal performance. The results in FIG. 5 were created with five overlay channels transmitting at 5 kW and the number of underlay nodes was varied. The undesired exposure threshold was fixed at 0 dB. As expected, the performance of the algorithm of the present invention algorithm approaches theoretical optimal as the number of nodes increase. Reference numerals 502, 504 and 506 represent randomized, the invention algorithm, and optimal channel selection performances.

Figure 6:
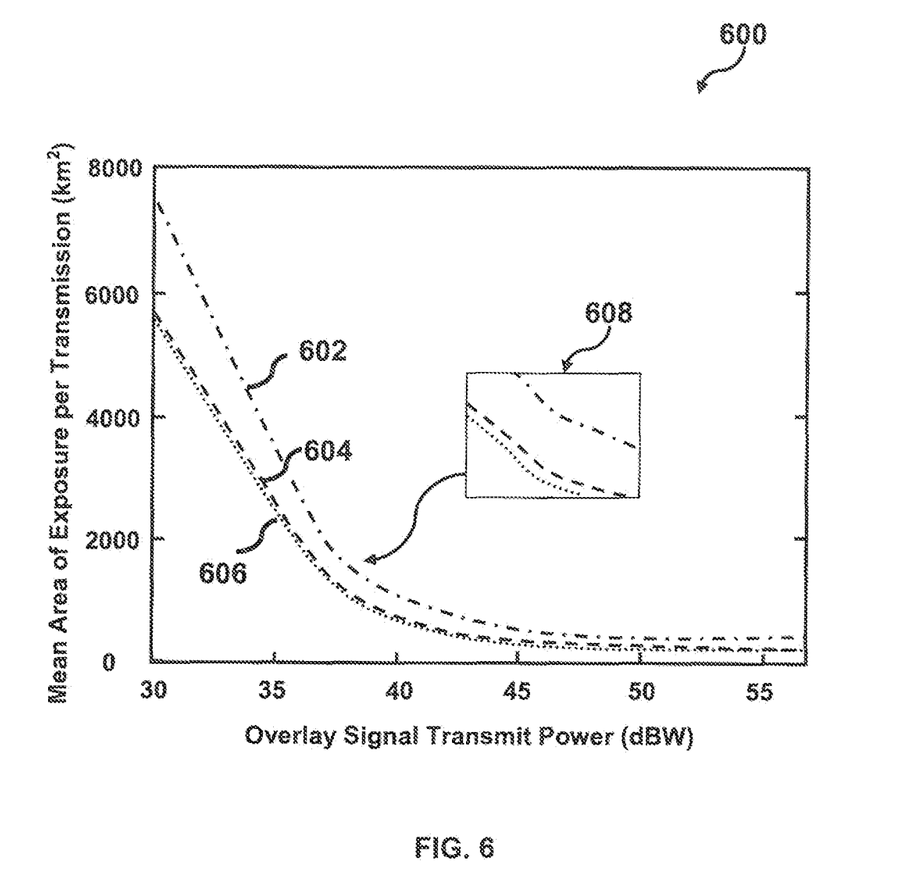
FIG. 6 illustrates a graph showing the expected area of undesirable exposure per transmission versus variation of overlay signal transmit power to demonstrate performance as a result of change in overlapping areas of overlay signal coverage, in accordance with the disclosed embodiments.

FIG. 6 illustrates a graph 600 showing varying overlay signal transmit power to demonstrate change in undesired exposure due to varying overlap in areas of overlay coverage. When the areas of coverage of the available overlay signals do not overlap much, the difference between expected area of exposure of the invention algorithm 604 and optimal 606 versus randomized 602 algorithms is much more apparent than when the areas of coverage of the overlay signals overlap. The expected area of undesired exposure also decreases as the overlay transmit power increases. The reference numeral 608 represents an enlarged view of the graph 600 as shown in FIG. 6.

V. Conclusions

Those skilled in the art will appreciate that it is proven the concept of the algorithm of the present invention algorithm and its capability to select a frequency for underlay communication. The benefits of the algorithm are shown with even as little as three underlay nodes to use as data points. As the number of underlay nodes increase, the performance of this algorithm rapidly approaches theoretical optimal performance.

This algorithm presents a way to improve spectral efficiency that addresses many of the concerns with previous methods. The algorithm does not require knowledge of underlay or overlay location, underlays and overlays may transmit at the same time, and coordination between the underlay and overlay is not necessary. The algorithm can be adapted to benefit communications in varying conditions.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

What is claimed is:

1. A method for selecting the best frequency channel to communicate on in a wireless network having one or more underlay nodes using one or more predefined set of frequencies comprising:

collecting initial SNR information from initial detection of other underlay nodes by each of the one or more underlay nodes;

using collected SNR information to calculate a minimum transmit power for each of the one or more underlay nodes, wherein the minimum transmit power is calculated by a transmitting underlay node transmitting a signal to each intended receiving underlay node;

using collected SNR information by each of the one or more underlay nodes to calculate a total exposure for each of the predefined set of frequencies, wherein the total exposure on a given frequency of the predefined set of frequencies is the combination of exposure from all transmitting nodes to all possible receiving nodes integrated over all one or more underlay nodes;

adjusting the minimum transmit power by each of the one or more underlay nodes for each of the corresponding intended receiving underlay node such that the signal is received at lowest allowable underlay-to-overlay power ratio, thus minimizing exposure;

setting desired underlay-to-overlay ratio by each of the one or more underlay nodes based on capability of cancelling overlay signal and an allowable SINR such that data is successfully received from each of the one or more underlay nodes; and selecting a frequency channel by the underlay nodes is based on least total exposure, wherein the selected frequency is $$\hat{f} = \underset{f \in F}{\operatorname{argmin}} \left\{ \sum_{i=1}^{N} \sum_{j=1, j \neq i}^{N} \int_{x,y \in X} \varepsilon_{i,f}(x, y, p_{i,j}(f)), dxdy \right\},$$

where (x,y) is a location of one or more underlay nodes, N is the total number of underlay nodes, $p_{i,j}(f)$ is the power of one or more underlay node locations.

2. The method of claim 1 wherein the step of selecting a channel comprises of firstly scanning the available frequency channels and measuring an interference power of the non-cooperative RF transmissions related to each of the one or more underlay nodes by the one or more underlay nodes.

3. The method of claim 2 further comprising detecting the presence of other underlay nodes and measures a signal power received from each of the existing underlay nodes.

4. The method of claim 3 further comprising sharing the SNR information, the minimum transmit power, the total exposure value, and the adjusted transmit power between all of the underlay nodes in the said network.

5. The method of claim 4 wherein a designated underlay node uses the received information to select the frequency channel that minimizes exposure of an underlay network to the other existing networks.

6. The method of claim 5 wherein each underlay node is also assigned a transmit power such that it is received at the intended destination node at a predefined level below the existing interference signals so that the threshold can be user defined but is set based on how much overlay signal interference the receiver can successfully cancel and the SINR where the underlay signal could be recovered.

7. The method of claim 1 wherein the underlay nodes do not require knowledge of geographical location of other underlay nodes, relative location of the overlay nodes and underlays and overlays may transmit at the same time.

* * * * *